US010153875B2

(12) United States Patent
Patel et al.

(10) Patent No.: US 10,153,875 B2
(45) Date of Patent: Dec. 11, 2018

(54) TRAFFIC DATA ALLOCATIONS IN LOW LATENCY LTE DOWNLINK COMMUNICATIONS

(71) Applicant: QUALCOMM Incorporated, San Diego, CA (US)

(72) Inventors: Shimman Arvind Patel, San Diego, CA (US); Wanshi Chen, San Diego, CA (US); Aleksandar Damnjanovic, Del Mar, CA (US); Peter Gaal, San Diego, CA (US); Madhavan Srinivasan Vajapeyam, San Diego, CA (US); Hao Xu, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 128 days.

(21) Appl. No.: 14/925,501

(22) Filed: Oct. 28, 2015

(65) Prior Publication Data

US 2016/0173247 A1    Jun. 16, 2016

Related U.S. Application Data

(60) Provisional application No. 62/090,840, filed on Dec. 11, 2014.

(51) Int. Cl.
*H04W 72/04* (2009.01)
*H04L 5/00* (2006.01)
*H04L 1/18* (2006.01)

(52) U.S. Cl.
CPC ....... *H04L 5/0044* (2013.01); *H04W 72/0406* (2013.01); *H04W 72/0446* (2013.01); *H04L 1/1812* (2013.01)

(58) Field of Classification Search
None
See application file for complete search history.

(56) References Cited

U.S. PATENT DOCUMENTS

2009/0296641 A1*  12/2009  Bienas .................. H04W 24/02
                                                         370/329
2011/0077039 A1*  3/2011  Lee ....................... H04L 5/0007
                                                         455/507

(Continued)

FOREIGN PATENT DOCUMENTS

GB          2 487 782 A      8/2012
WO      WO 2013063780    *   5/2013

OTHER PUBLICATIONS

International Search Report and Written Opinion—PCT/US2015/058125—ISA/EPO—dated Jan. 25, 2016. (13 total pages).

*Primary Examiner* — Gregory B Sefcheck
*Assistant Examiner* — Jenkey Van
(74) *Attorney, Agent, or Firm* — Anthony R. Morris

(57) ABSTRACT

Various aspects are described relating to wireless communications of a second type of traffic data for small data transmissions. A first indication of control channel resources can be received from a network entity, wherein the control channel resources are defined by a radio access technology to include control data associated with a first type of traffic data. A control channel can be received from the network entity over the control channel resources, wherein the control channel includes a second type of traffic data, wherein the second type of traffic data includes a comparatively smaller data payload than the first type of traffic data. The second type of traffic data can be decoded from the control channel without decoding control data from the control channel.

26 Claims, 9 Drawing Sheets

(56) References Cited

U.S. PATENT DOCUMENTS

| | | |
|---|---|---|
| 2011/0182385 A1* | 7/2011 | Doan ................ H03M 13/3738 375/340 |
| 2012/0207126 A1 | 8/2012 | Qu et al. |
| 2013/0039297 A1* | 2/2013 | Wang .................... H04W 76/25 370/329 |
| 2013/0121168 A1 | 5/2013 | Luo et al. |
| 2014/0036821 A1* | 2/2014 | Mcnamara ............ H04L 5/0007 370/329 |
| 2014/0192767 A1 | 7/2014 | Au et al. |
| 2014/0226607 A1* | 8/2014 | Holma .................. H04L 1/1812 370/329 |

* cited by examiner

TRAFFIC DATA ALLOCATIONS IN LOW LATENCY LTE DOWNLINK COMMUNICATIONS

CLAIM OF PRIORITY UNDER 35 U.S.C. § 119

The present Application for Patent claims priority to Provisional Application No. 62/090,840 entitled "TRAFFIC DATA ALLOCATIONS IN LOW LATENCY LTE DOWNLINK COMMUNICATIONS" filed Dec. 11, 2014, which is assigned to the assignee hereof and hereby expressly incorporated by reference herein.

BACKGROUND

Described herein are aspects generally related to communication systems, and more particularly, to allocating traffic data resources in wireless communications.

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example of a telecommunication standard is Long Term Evolution (LTE). LTE is a set of enhancements to the Universal Mobile Telecommunications System (UMTS) mobile standard promulgated by Third Generation Partnership Project (3GPP). It is designed to better support mobile broadband Internet access by improving spectral efficiency, lower costs, improve services, make use of new spectrum, and better integrate with other open standards using OFDMA on the downlink (DL), SC-FDMA on the uplink (UL), and multiple-input multiple-output (MIMO) antenna technology. However, as the demand for mobile broadband access continues to increase, improvements in LTE technology may be desired. Preferably, these improvements should be applicable to other multi-access technologies and the telecommunication standards that employ these technologies.

In wireless communication systems employing legacy LTE, a plurality of UEs served by a particular eNodeB may be scheduled resources for communicating with the eNodeB over one or more channels using transmission time intervals (TTI) on the order of a 1 millisecond subframe. As UE capabilities and demand for bandwidth increases, lower latency in communications may be desired.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

According to an example, a method of wireless communications is provided. The method includes receiving a first indication of control channel resources from a network entity, where the control channel resources are defined by a radio access technology to include control data associated with a first type of traffic data. The method also includes receiving a control channel from the network entity over the control channel resources, where the control channel includes a second type of traffic data, and where the second type of traffic data includes a comparatively smaller data payload than the first type of traffic data. Also, the method includes decoding the second type of traffic data from the control channel without decoding control data from the control channel.

In other aspects, a user equipment for wireless communication is provided. The user equipment includes a transceiver, at least one processor communicatively coupled with the transceiver, via a bus, for communicating signals in a wireless network, and a memory communicatively coupled with the at least one processor and/or the transceiver via the bus. The at least one processor and the memory are operable to receive, via the transceiver, a first indication of control channel resources from a network entity, where the control channel resources are defined by a radio access technology to include control data associated with a first type of traffic data. The at least one processor and the memory are further operable to receive, via the transceiver, a control channel from the network entity over the control channel resources, where the control channel includes a second type of traffic data, and where the second type of traffic data includes a comparatively smaller data payload than the first type of traffic data. The at least one processor and the memory are also operable to decode the second type of traffic data from the control channel without decoding control data from the control channel.

In another example, user equipment for wireless communications is provided. The user equipment includes means for receiving a first indication of control channel resources from a network entity, where the control channel resources are defined by a radio access technology to include control data associated with a first type of traffic data. The user equipment also includes means for receiving a control channel from the network entity over the control channel resources, where the control channel includes a second type of traffic data, and where the second type of traffic data includes a comparatively smaller data payload than the first type of traffic data. Furthermore, the user equipment includes means for decoding the second type of traffic data from the control channel without decoding control data from the control channel.

In other aspects, a computer-readable storage medium including computer-executable code for wireless communications is provided. The code includes code for receiving a first indication of control channel resources from a network entity, where the control channel resources are defined by a radio access technology to include control data associated with a first type of traffic data. The code also includes code for receiving a control channel from the network entity over the control channel resources, where the control channel includes a second type of traffic data, and where the second type of traffic data includes a comparatively smaller data payload than the first type of traffic data. Additionally, the code includes code for decoding the second type of traffic data from the control channel without decoding control data from the control channel.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

In order to facilitate a fuller understanding of aspects described herein, reference is now made to the accompanying drawings, in which like elements are referenced with like numerals. These drawings should not be construed as limiting the present disclosure, but are intended to be illustrative only.

DETAILED DESCRIPTION

Figure 1:
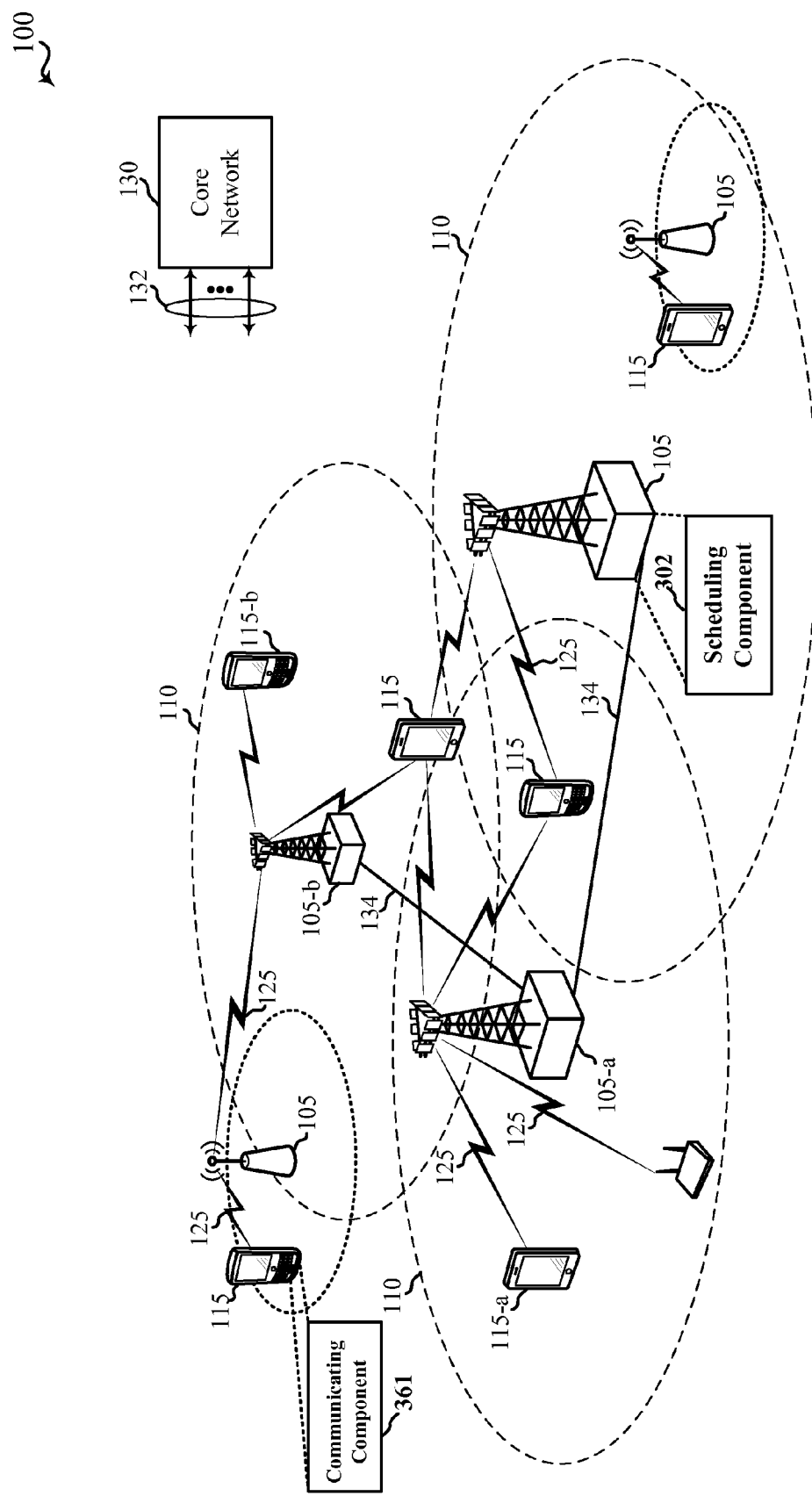
FIG. 1 shows a block diagram conceptually illustrating an example of a telecommunications system, in accordance with aspects described herein.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, modules, components, circuits, steps, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise.

Accordingly, in one or more aspects, the functions described may be implemented in hardware, software, firmware, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), and floppy disk where disks usually reproduce data magnetically, while discs reproduce data optically with lasers. Combinations of the above should also be included within the scope of computer-readable media.

Described herein are various aspects related to allocating traffic data resources in wireless communications. For example, a wireless technology may be based on a shorter transmission time interval (TTI) than an existing wireless technology. In one specific example, in long term evolution (LTE), which is based on a TTI of 1 millisecond (ms) (1 subframe), ultra low latency (ULL) long term evolution (LTE) can be defined as based on a TTI having a duration less than a subframe (e.g., one symbol, two symbols, a subframe slot, etc.). In this regard, a lower latency in communications is achieved by the shorter, more frequent TTI. Some user equipment (UE) operating using ULL LTE, however, may be of a type that does not transmit/receive communications in the wireless network very frequently (e.g., machine-to-machine (M2M) devices). As such, allocating traffic data resources for such devices may consume significant overhead and radio frequency (RF) resources where only a small amount of data is to be communicated to/from the UEs in a given period of time. Accordingly, described herein are examples relating to efficiently allocating resources in lower latency communications (e.g., in ULL LTE or other technologies having a TTI less than 1 subframe) for communicating small amounts of data (e.g., data having packet sizes that are less than 100 bits).

Referring first to FIG. 1, a diagram illustrates an example of a wireless communications system 100, in accordance with aspects described herein. The wireless communications system 100 includes a plurality of access points (e.g., base stations, eNBs, or WLAN access points) 105, a number of user equipment (UEs) 115, and a core network 130. Access points 105 may include a scheduling component 302 configured to allocate resources for communicating data (e.g., a small amount of data) with one or more UEs 115, as described further herein. Similarly, one or more of UEs 115 may include a communicating component 361 configured to receive or otherwise determine resources utilized for communicating data (e.g., a small amount of data) with the access points 105. Some of the access points 105 may communicate with the UEs 115 under the control of a base station controller (not shown), which may be part of the core network 130 or the certain access points 105 (e.g., base stations or eNBs) in various examples. Access points 105 may communicate control information and/or user data with the core network 130 through backhaul links 132. In examples, the access points 105 may communicate, either directly or indirectly, with each other over backhaul links 134, which may be wired or wireless communication links. The wireless communications system 100 may support operation on multiple carriers (waveform signals of different frequencies). Multi-carrier transmitters can transmit modulated signals simultaneously on the multiple carriers. For example, each communication link 125 may be a multi-carrier signal modulated according to the various radio technologies described above. Each modulated signal may be sent on a different carrier and may carry control information (e.g., reference signals, control channels, etc.), overhead information, data, etc.

In some examples, at least a portion of the wireless communications system 100 may be configured to operate on multiple hierarchical layers in which one or more of the UEs 115 and one or more of the access points 105 may be configured to support transmissions on a hierarchical layer that has a reduced latency with respect to another hierarchical layer. In some examples, a hybrid UE 115-a may communicate with access point 105-a on both a first hierarchical layer that supports first layer transmissions using a first TTI (also referred to herein as "legacy communications") and a second hierarchical layer that supports second layer transmissions using a second TTI, which may be shorter than the first TTI (also referred to herein as "ULL communications").

In other examples, a second layer UE 115-b may communicate with access point 105-b on the second hierarchical layer only. Thus, hybrid UE 115-a and second layer UE 115-b may belong to a second class of UEs 115 that may communicate on the second hierarchical layer, while legacy UEs 115 may belong to a first class of UEs 115 that may communicate on the first hierarchical layer only. Access point 105-b and UE 115-b may communicate on the second hierarchical layer through transmissions of subframes of the second subframe type. Access point 105-b may transmit communications related to the first or second hierarchical layer only or may transmit communications for both the first and second hierarchical layers. Where an access point 105-b supports both the first and second hierarchical layers, communicating component 361 can be configured to prioritize communications received from the access point 105-b that relate to the first and second hierarchical layers, as described herein.

The access points 105 may wirelessly communicate with the UEs 115 via one or more access point antennas. Each of the access points 105 sites may provide communication coverage for a respective coverage area 110. In some examples, access points 105 may be referred to as a base transceiver station, a radio base station, a radio transceiver, a basic service set (BSS), an extended service set (ESS), a NodeB, eNodeB, Home NodeB, a Home eNodeB, or some other suitable terminology. The coverage area 110 for a base station may be divided into sectors making up only a portion of the coverage area (not shown). The wireless communications system 100 may include access points 105 of different types (e.g., macro, micro, and/or pico base stations). The access points 105 may also utilize different radio technologies, such as cellular and/or WLAN radio access technologies (RATs). The access points 105 may be associated with the same or different access networks or operator deployments. The coverage areas of different access points 105, including the coverage areas of the same or different types of access points 105, utilizing the same or different radio technologies, and/or belonging to the same or different access networks, may overlap.

In LTE/LTE-A and/or ULL LTE network communication systems, the terms evolved Node B (eNodeB or eNB) may be generally used to describe the access points 105. The wireless communications system 100 may be a Heterogeneous LTE/LTE-A/ULL LTE network in which different types of access points provide coverage for various geographical regions. For example, each access point 105 may provide communication coverage for a macro cell, a pico cell, a femto cell, and/or other types of cell. Small cells such as pico cells, femto cells, and/or other types of cells may include low power nodes or LPNs. A macro cell generally covers a relatively large geographic area (e.g., several kilometers in radius) and may allow unrestricted access by UEs 115 with service subscriptions with the network provider. A small cell would generally cover a relatively smaller geographic area and may allow unrestricted access by UEs 115 with service subscriptions with the network provider, for example, and in addition to unrestricted access, may also provide restricted access by UEs 115 having an association with the small cell (e.g., UEs in a closed subscriber group (CSG), UEs for users in the home, and the like). An eNB for a macro cell may be referred to as a macro eNB. An eNB for a small cell may be referred to as a small cell eNB. An eNB may support one or multiple (e.g., two, three, four, and the like) cells.

The core network 130 may communicate with the eNBs or other access points 105 via one or more backhaul links 132 (e.g., S1 interface, etc.). The access points 105 may also communicate with one another, e.g., directly or indirectly via backhaul links 134 (e.g., X2 interface, etc.) and/or via backhaul links 132 (e.g., through core network 130). The wireless communications system 100 may support synchronous or asynchronous operation. For synchronous operation, the access points 105 may have similar frame timing, and transmissions from different access points 105 may be approximately aligned in time. For asynchronous operation, the access points 105 may have different frame timing, and transmissions from different access points 105 may not be aligned in time. Furthermore, transmissions in the first hierarchical layer and second hierarchical layer may or may not be synchronized among access points 105. The techniques described herein may be used for either synchronous or asynchronous operations.

The UEs 115 are dispersed throughout the wireless communications system 100, and each UE 115 may be stationary or mobile. A UE 115 may also be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. A UE 115 may be a cellular phone, a personal digital assistant (PDA), a wireless modem, a wireless communication device, a hand-held device, a tablet computer, a laptop computer, a cordless phone, a wearable item such as a watch or glasses, a wireless local loop (WLL) station, or the like. A UE 115 may be able to communicate with macro eNodeBs, small cell eNodeBs, relays, and the like. A UE 115 may also be able to communicate over different access networks, such as cellular or other WWAN access networks, or WLAN access networks.

The communication links 125 shown in wireless communications system 100 may include uplink (UL) transmissions from a UE 115 to an access point 105, and/or downlink (DL) transmissions, from an access point 105 to a UE 115. The downlink transmissions may also be called forward link transmissions while the uplink transmissions may also be called reverse link transmissions. The communication links 125 may carry transmissions of each hierarchical layer which, in some examples, may be multiplexed in the communication links 125. The UEs 115 may be configured to collaboratively communicate with multiple access points 105 through, for example, Multiple Input Multiple Output (MIMO), carrier aggregation (CA), Coordinated Multi-Point (CoMP), or other schemes. MIMO techniques use multiple antennas on the access points 105 and/or multiple antennas on the UEs 115 to transmit multiple data streams. Carrier aggregation may utilize two or more component carriers on a same or different serving cell for data transmission. CoMP may include techniques for coordination of transmission and reception by a number of access points 105 to improve overall transmission quality for UEs 115 as well as increasing network and spectrum utilization.

As mentioned, in some examples access points 105 and UEs 115 may utilize carrier aggregation to transmit on multiple carriers. In some examples, access points 105 and UEs 115 may concurrently transmit in a first hierarchical layer, within a frame, one or more subframes each having a first subframe type using two or more separate carriers. Each carrier may have a bandwidth of, for example, 20 MHz, although other bandwidths may be utilized. Hybrid UE 115-a, and/or second layer UE 115-b may, in certain examples, receive and/or transmit one or more subframes in a second hierarchical layer utilizing a single carrier that has a bandwidth greater than a bandwidth of one or more of the separate carriers. For example, if four separate 20 MHz carriers are used in a carrier aggregation scheme in the first hierarchical layer, a single 80 MHz carrier may be used in the second hierarchical layer. The 80 MHz carrier may occupy a portion of the radio frequency spectrum that at least partially overlaps the radio frequency spectrum used by one or more of the four 20 MHz carriers. In some examples, scalable bandwidth for the second hierarchical layer type may be combined techniques to provide shorter RTTs such as described above, to provide further enhanced data rates.

Each of the different operating modes that may be employed by wireless communications system 100 may operate according to frequency division duplexing (FDD) or time division duplexing (TDD). In some examples, different hierarchical layers may operate according to different TDD or FDD modes. For example, a first hierarchical layer may operate according to FDD while a second hierarchical layer may operate according to TDD. In some examples, OFDMA communications signals may be used in the communication links 125 for LTE downlink transmissions for each hierarchical layer, while single carrier frequency division multiple access (SC-FDMA) communications signals may be used in the communication links 125 for LTE uplink transmissions in each hierarchical layer. Additional details regarding implementation of hierarchical layers in a system such as the wireless communications system 100, as well as other features and functions related to communications in such systems, are provided below with reference to the following figures.

Figure 2:
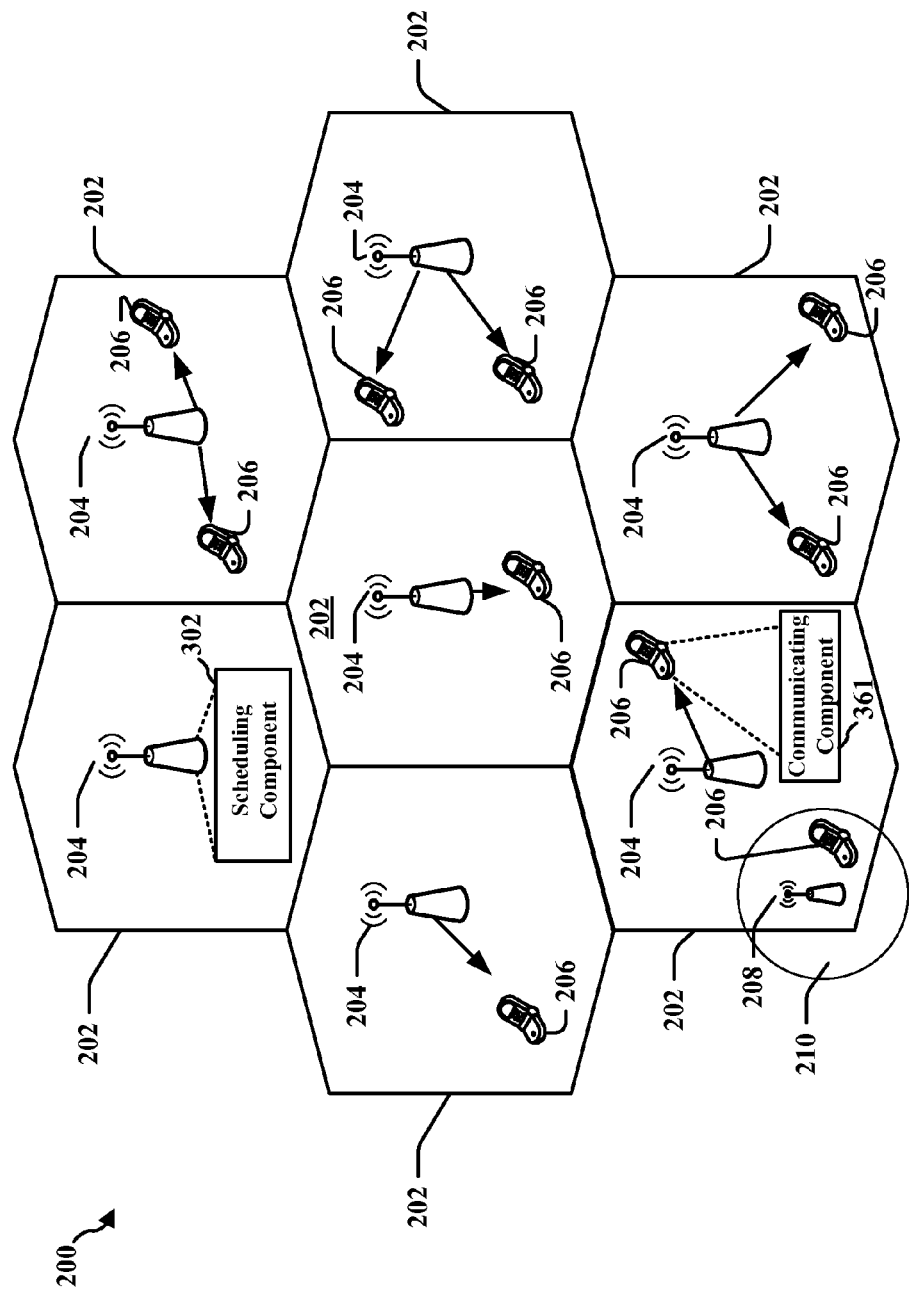
FIG. 2 is a diagram illustrating an example of an access network.

FIG. 2 is a diagram illustrating an example of an access network 200 in an LTE or ULL LTE network architecture. In this example, the access network 200 is divided into a number of cellular regions (cells) 202. One or more lower power class eNBs 208 may have cellular regions 210 that overlap with one or more of the cells 202. The lower power class eNB 208 may be a femto cell (e.g., home eNB (HeNB)), pico cell, micro cell, or remote radio head (RRH). The macro eNBs 204 are each assigned to a respective cell 202 and are configured to provide an access point to the core network 130 for all the UEs 206 in the cells 202. In an aspect, eNBs 204 (or lower power class eNBs 208) may include scheduling component 302 configured to allocate resources for communicating data (e.g., a small amount of data) with one or more UEs 206, as described further herein. Similarly, one or more of UEs 206 may include a communicating component 361 configured to receive or otherwise determine resources utilized for communicating data (e.g., a small amount of data) with the eNBs 204 and/or lower power class eNBs 208. There is no centralized controller in this example of an access network 200, but a centralized controller may be used in alternative configurations. The eNBs 204 are responsible for all radio related functions including radio bearer control, admission control, mobility control, scheduling, security, and connectivity to one or more components of core network 130.

The modulation and multiple access scheme employed by the access network 200 may vary depending on the particular telecommunications standard being deployed. In LTE or ULL LTE applications, OFDM may be used on the DL and SC-FDMA may be used on the UL to support both frequency division duplexing (FDD) and time division duplexing (TDD). As those skilled in the art will readily appreciate from the detailed description to follow, the various concepts presented herein are well suited for LTE applications. However, these concepts may be readily extended to other telecommunication standards employing other modulation and multiple access techniques. By way of example, these concepts may be extended to Evolution-Data Optimized (EV-DO) or Ultra Mobile Broadband (UMB). EV-DO and UMB are air interface standards promulgated by the 3rd Generation Partnership Project 2 (3GPP2) as part of the CDMA2000 family of standards and employs CDMA to provide broadband Internet access to mobile stations. These concepts may also be extended to Universal Terrestrial Radio Access (UTRA) employing Wideband-CDMA (W-CDMA) and other variants of CDMA, such as TD-SCDMA; Global System for Mobile Communications (GSM) employing TDMA; and Evolved UTRA (E-UTRA), IEEE 802.11 (Wi-Fi), IEEE 802.16 (WiMAX), IEEE 802.20, and Flash-OFDM employing OFDMA. UTRA, E-UTRA, UMTS, LTE and GSM are described in documents from the 3GPP organization. CDMA2000 and UMB are described in documents from the 3GPP2 organization.

The actual wireless communication standard and the multiple access technology employed will depend on the specific application and the overall design constraints imposed on the system.

The eNBs 204 may have multiple antennas supporting MIMO technology. The use of MIMO technology enables the eNBs 204 to exploit the spatial domain to support spatial multiplexing, beamforming, and transmit diversity. Spatial multiplexing may be used to transmit different streams of data simultaneously on the same frequency. The data steams may be transmitted to a single UE 206 to increase the data rate or to multiple UEs 206 to increase the overall system capacity. This is achieved by spatially precoding each data stream (i.e., applying a scaling of an amplitude and a phase) and then transmitting each spatially precoded stream through multiple transmit antennas on the DL. The spatially precoded data streams arrive at the UE(s) 206 with different spatial signatures, which enables each of the UE(s) 206 to recover the one or more data streams destined for that UE 206. On the UL, each UE 206 transmits a spatially precoded data stream, which enables the eNB 204 to identify the source of each spatially precoded data stream.

Spatial multiplexing is generally used when channel conditions are good. When channel conditions are less favorable, beamforming may be used to focus the transmission energy in one or more directions. This may be achieved by spatially precoding the data for transmission through multiple antennas. To achieve good coverage at the edges of the cell, a single stream beamforming transmission may be used in combination with transmit diversity.

In the detailed description that follows, various aspects of an access network will be described with reference to a MIMO system supporting OFDM on the DL. OFDM is a spread-spectrum technique that modulates data over a number of subcarriers within an OFDM symbol. The subcarriers are spaced apart at precise frequencies. The spacing provides "orthogonality" that enables a receiver to recover the data from the subcarriers. In the time domain, a guard interval (e.g., cyclic prefix) may be added to each OFDM symbol to combat inter-OFDM-symbol interference. The UL may use SC-FDMA in the form of a DFT-spread OFDM signal to compensate for high peak-to-average power ratio (PAPR).

Figure 3:
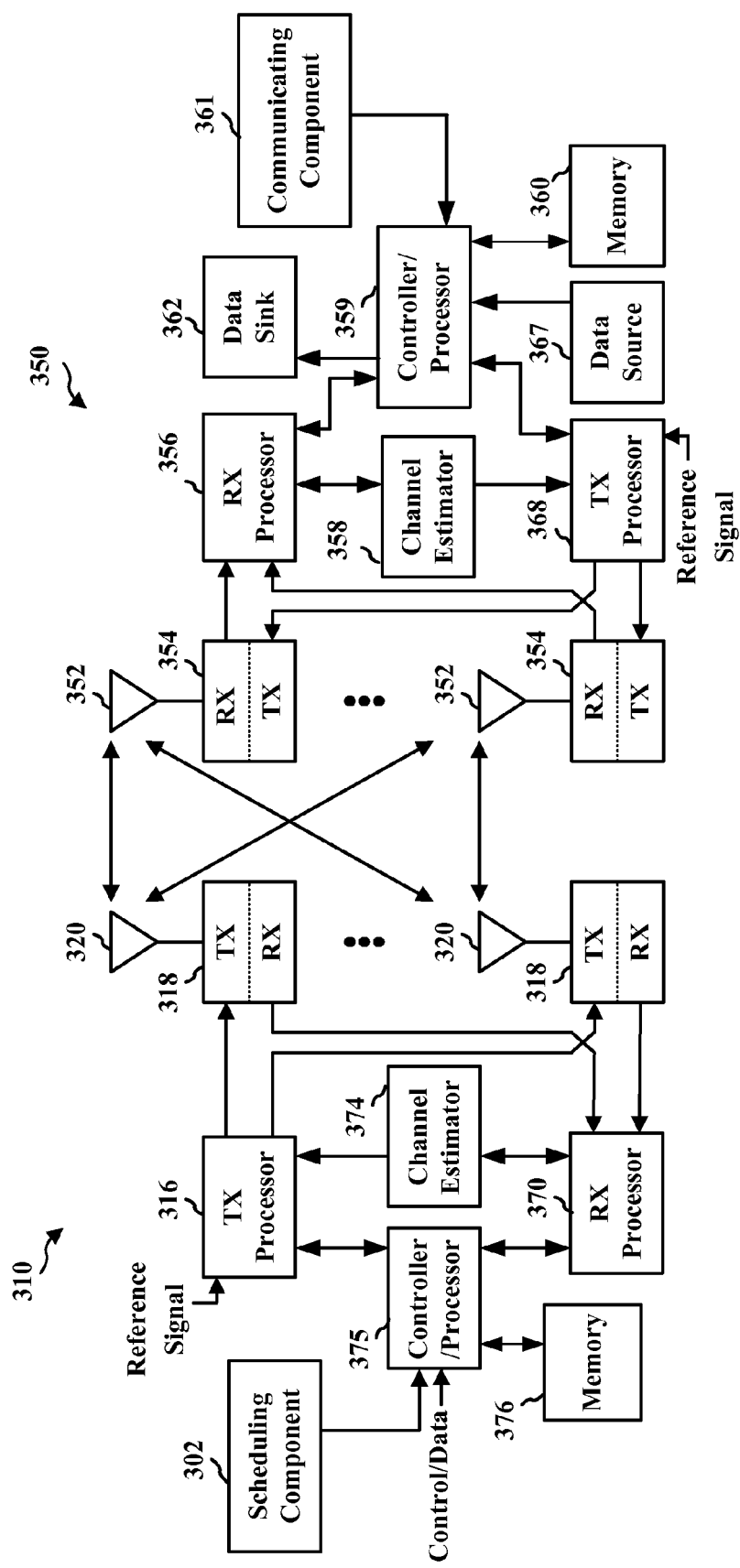
FIG. 3 is a diagram illustrating an example of an evolved Node B and user equipment in an access network.

FIG. 3 is a block diagram of an eNB 310 in communication with a UE 350 in an access network. In the DL, upper layer packets from the core network are provided to a controller/processor 375. The controller/processor 375 implements the functionality of the L2 layer. In the DL, the controller/processor 375 provides header compression, ciphering, packet segmentation and reordering, multiplexing between logical and transport channels, and radio resource allocations to the UE 350 based on various priority metrics. The controller/processor 375 is also responsible for hybrid automatic repeat/request (HARQ) operations, retransmission of lost packets, and signaling to the UE 350.

The transmit (TX) processor 316 implements various signal processing functions for the L1 layer (i.e., physical layer). The signal processing functions includes coding and interleaving to facilitate forward error correction (FEC) at the UE 350 and mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols are then split into parallel streams. Each stream is then mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream is then provided to a different antenna 320 via a separate transmitter 318TX. Each transmitter 318TX modulates an RF carrier with a respective spatial stream for transmission. In addition, eNB 310 may include scheduling component 302 configured to allocate resources for communicating data (e.g., a small amount of data) with UE 350, as described further herein. Though scheduling component 302 is shown as coupled to controller/processor 375, it is to be appreciated that scheduling component 302 can also be coupled to other processors (e.g., RX processor 370, TX processor 316, etc.) and/or implemented by the one or more processors 316, 370, 375 to perform actions described herein At the UE 350, each receiver 354RX receives a signal through its respective antenna 352. Each receiver 354RX recovers information modulated onto an RF carrier and provides the information to the receive (RX) processor 356. The RX processor 356 implements various signal processing functions of the L1 layer. The RX processor 356 performs spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, is recovered and demodulated by determining the most likely signal constellation points transmitted by the eNB 310. These soft decisions may be based on channel estimates computed by the channel estimator 358. The soft decisions are then decoded and deinterleaved to recover the data and control signals that were originally transmitted by the eNB 310 on the physical channel. The data and control signals are then provided to the controller/processor 359.

The controller/processor 359 implements the L2 layer. The controller/processor can be associated with a memory 360 that stores program codes and data. The memory 360 may be referred to as a computer-readable medium. In the UL, the controller/processor 359 provides demultiplexing between transport and logical channels, packet reassembly, deciphering, header decompression, control signal processing to recover upper layer packets from the core network. The upper layer packets are then provided to a data sink 362, which represents all the protocol layers above the L2 layer. Various control signals may also be provided to the data sink 362 for L3 processing. The controller/processor 359 is also responsible for error detection using an acknowledgement (ACK) and/or negative acknowledgement (NACK) protocol to support HARQ operations. In addition, UE 350 may include a communicating component 361 configured to receive or otherwise determine resources utilized for communicating data (e.g., a small amount of data) with eNB 310. Though communicating component 361 is shown as coupled to controller/processor 359, it is to be appreciated that communicating component 361 can also be coupled to other processors (e.g., RX processor 356, TX processor 368, etc.)

and/or implemented by the one or more processors 356, 359, 368 to perform actions described herein.

In the UL, a data source 367 is used to provide upper layer packets to the controller/processor 359. The data source 367 represents all protocol layers above the L2 layer. Similar to the functionality described in connection with the DL transmission by the eNB 310, the controller/processor 359 implements the L2 layer for the user plane and the control plane by providing header compression, ciphering, packet segmentation and reordering, and multiplexing between logical and transport channels based on radio resource allocations by the eNB 310. The controller/processor 359 is also responsible for HARQ operations, retransmission of lost packets, and signaling to the eNB 310.

Channel estimates derived by a channel estimator 358 from a reference signal or feedback transmitted by the eNB 310 may be used by the TX processor 368 to select the appropriate coding and modulation schemes, and to facilitate spatial processing. The spatial streams generated by the TX processor 368 are provided to different antenna 352 via separate transmitters 354TX. Each transmitter 354TX modulates an RF carrier with a respective spatial stream for transmission.

The UL transmission is processed at the eNB 310 in a manner similar to that described in connection with the receiver function at the UE 350. Each receiver 318RX receives a signal through its respective antenna 320. Each receiver 318RX recovers information modulated onto an RF carrier and provides the information to a RX processor 370. The RX processor 370 may implement the L1 layer.

The controller/processor 375 implements the L2 layer. The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover upper layer packets from the UE 350. Upper layer packets from the controller/processor 375 may be provided to the core network. The controller/processor 375 is also responsible for error detection using an ACK and/or NACK protocol to support HARQ operations.

Figure 4:
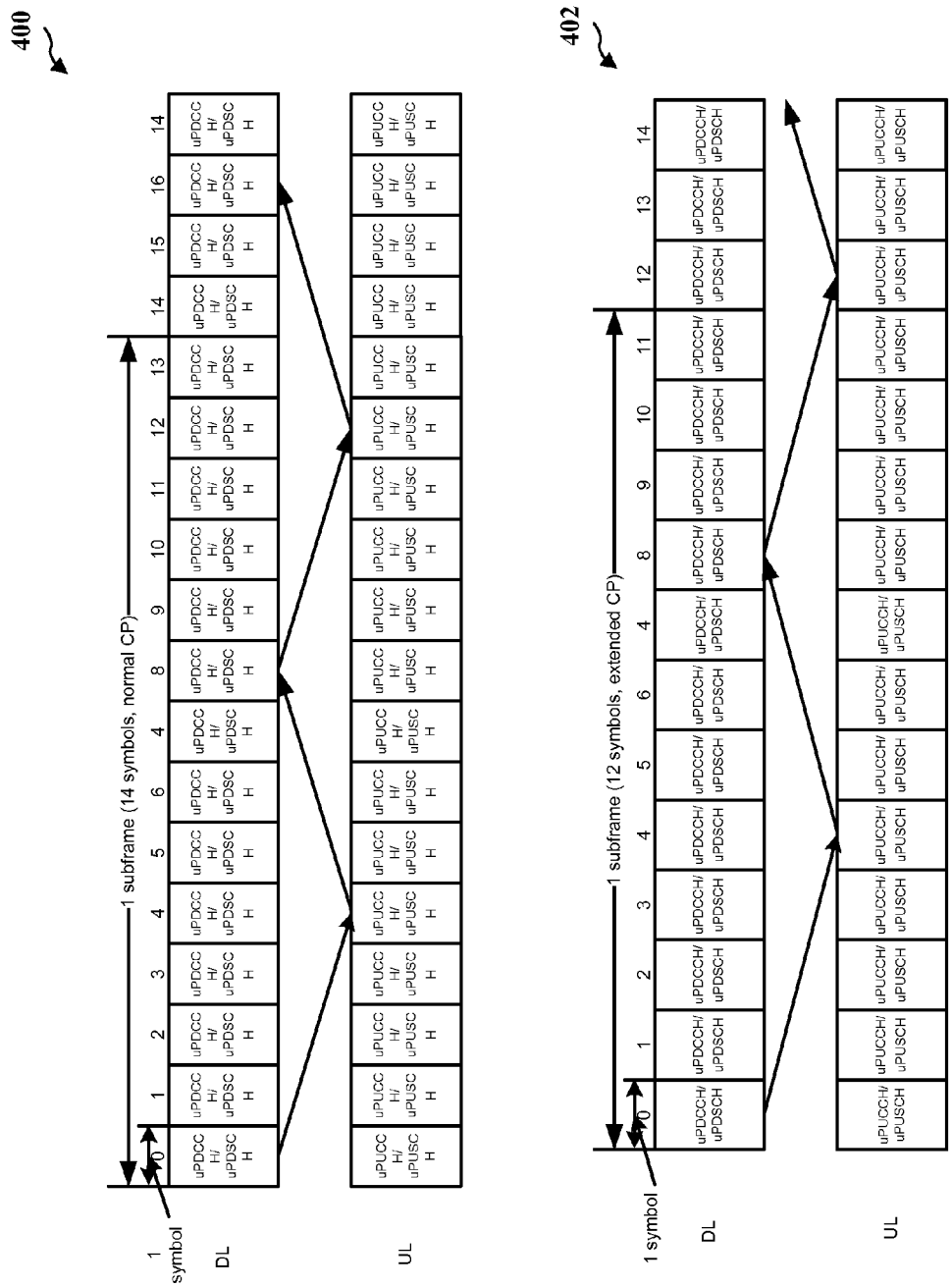
FIG. 4 is a diagram illustrating example timelines for uplink bandwidth allocation.

FIG. 4 is a diagram illustrating non-limiting examples of a ULL timelines 400, 402, with time progression extending from left to right in the figure, for managing ULL communications in a wireless communication system. In this example, timelines 400, 402 include ULL frames of symbol duration in each symbol of a subframe. Timelines 400, 402 both depict symbols representing a TTI for ULL physical downlink control channel (uPDCCH) and/or ULL physical downlink shared channel (uPDSCH) and symbols representing a TTI including ULL physical uplink control channel (uPUCCH) and/or ULL physical uplink shared channel (uPUSCH). In timelines 400, 14 symbols are shown within a given subframe (e.g., for normal CP), and in timelines 402, 12 symbols are shown within a given subframe (e.g., for extended CP). In either case, lower latency is achieved in ULL by utilizing symbol-based TTIs. It is to be appreciated, in other examples, that a TTI may be two or more symbols, a slot of a subframe (where a subframe includes two slots), etc. In addition, HARQ process response time can be 3 symbols (or 4 symbols, 3 dual-symbols, 3 slots, etc.). In the depicted example, uPDCCH/uPDSCH can be sent in symbol 0, and HARQ can be processed and is sent in symbol 4, etc. in the subframe.

Referring to FIGS. 5-9, aspects are depicted with reference to one or more components and one or more methods that may perform the actions or functions described herein. In an aspect, the term "component" as used herein may be one of the parts that make up a system, may be hardware or software or some combination thereof, and may be divided into other components. Although the operations described below in FIGS. 6-9 are presented in a particular order and/or as being performed by an example component, it should be understood that the ordering of the actions and the components performing the actions may be varied, depending on the implementation. Moreover, it should be understood that the following actions or functions may be performed by a specially-programmed processor, a processor executing specially-programmed software or computer-readable media, or by any other combination of a hardware component and/or a software component capable of performing the described actions or functions.

Figure 5:
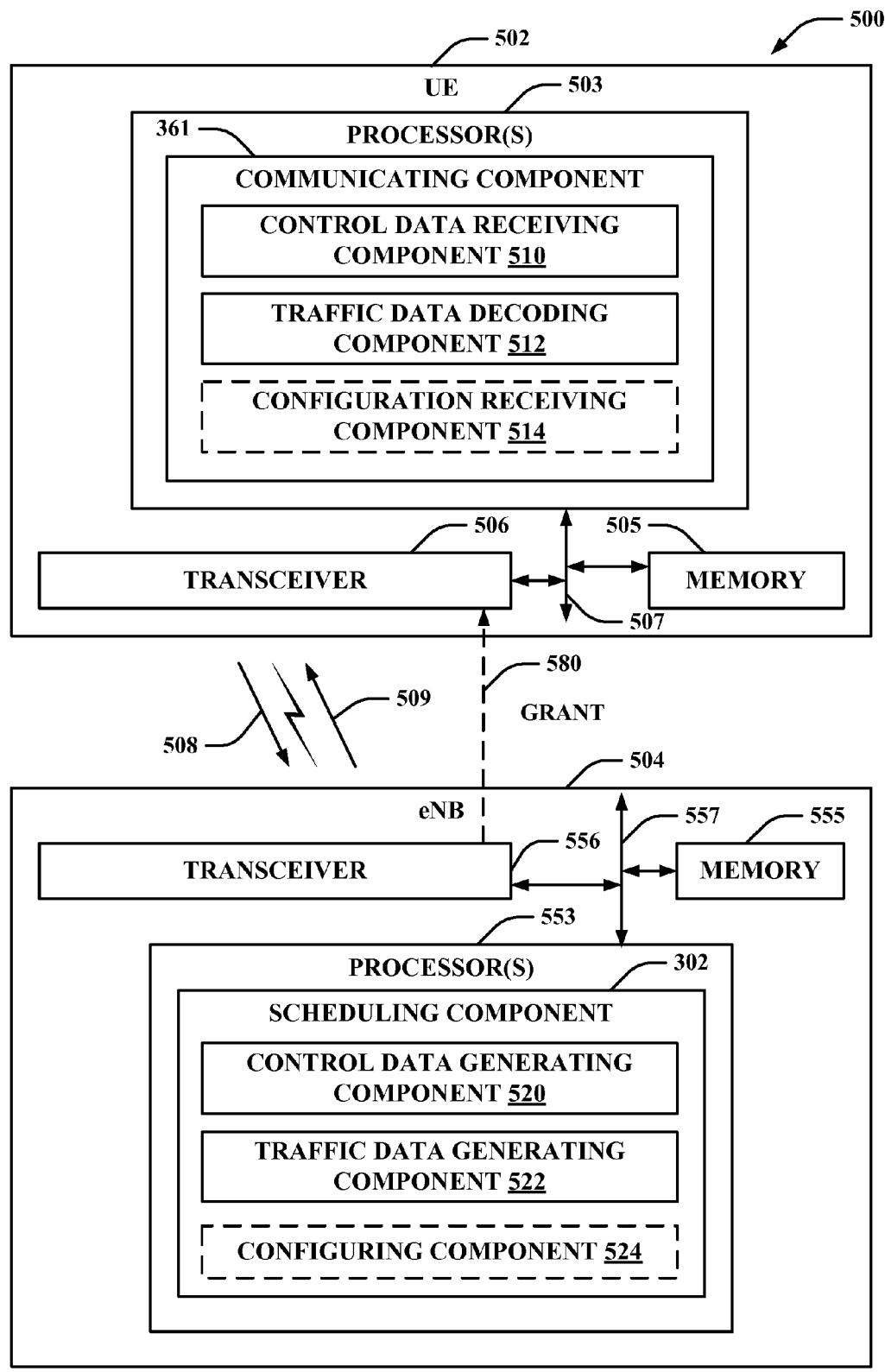
FIG. 5 is a diagram illustrating an example system for communicating small data transmissions in accordance with aspects described herein.

FIG. 5 illustrates an example system 500 for allocating resources for small data communications in ULL wireless communication systems. System 500 includes a UE 502 that communicates with an eNB 504 to access a wireless network, examples of which are described in FIGS. 1-3 (e.g., access points 105, eNB 204, 208, eNB 310, UEs 115, 206, 350, etc.), above. In an aspect, eNB 504 and UE 502 may have established one or more downlink channels over which to communicate via downlink signals 509, which can be transmitted by eNB 504 (e.g., via transceiver 556) and received by UE 502 (e.g., via transceiver 506) for communicating control and/or data messages (e.g., in signaling) from the eNB 504 to the UE 502 over configured communication resources. Moreover, for example, eNB 504 and UE 502 may have established one or more uplink channels over which to communicate via uplink signals 508, which can be transmitted by UE 502 (e.g., via transceiver 506) and received by eNB 504 (e.g., via transceiver 556) for communicating control and/or data messages (e.g., in signaling) from the UE 502 to the eNB 504 over configured communication resources. As described further herein, for example, eNB 504 may communicate a resource grant 580 that can indicate resources over which the UE 502 is to communicate (e.g., transmit or receive) data with eNB 504 over a ULL timeline (e.g., a timeline having a TTI that is less than a subframe in duration, such as the timelines 400, 402 in FIG. 4).

In an aspect, UE 502 may include one or more processors 503 and/or a memory 505 that may be communicatively coupled, e.g., via one or more buses 507, and may operate in conjunction with or otherwise implement a communicating component 361 for communicating with eNB 504 such to transmit uplink signals 508 thereto and/or receive downlink signals 509 therefrom based on a ULL timelines (e.g., a timeline having a TTI that is less than a subframe in duration, such as the timelines 400, 402 in FIG. 4). For example, the various operations related to communicating component 361 may be implemented or otherwise executed by one or more processors 503 and, in an aspect, can be executed by a single processor, while in other aspects, different ones of the operations may be executed by a combination of two or more different processors. For example, in an aspect, the one or more processors 503 may include any one or any combination of a modem processor, or a baseband processor, or a digital signal processor, or an application specific integrated circuit (ASIC), or a transmit processor, receive processor, or a transceiver processor associated with transceiver 506. Further, for example, the memory 505 may be a non-transitory computer-readable medium that includes, but is not limited to, random access memory (RAM), read only memory (ROM), programmable ROM (PROM), erasable PROM (EPROM), electrically erasable PROM (EEPROM), a magnetic storage device (e.g., hard disk, floppy disk, magnetic strip), an optical disk (e.g., compact disk (CD), digital versatile disk (DVD)), a smart card, a flash memory device (e.g., card, stick, key drive), a register, a removable disk, and any other suitable medium for storing software and/or computer-readable code or instructions that may be accessed and read by a computer or one or more processors 503. Moreover, memory 505 or computer-readable storage medium may be resident in the one or more processors 503, external to the one or more processors 503, distributed across multiple entities including the one or more processors 503, etc.

In particular, the one or more processors 503 and/or memory 505 may execute actions or operations defined by communicating component 361 or its subcomponents. For instance, the one or more processors 503 and/or memory 505 may execute actions or operations defined by a control data receiving component 510 for receiving control data from an eNB over assigned control channel resources. In an aspect, for example, control data receiving component 510 may include hardware (e.g., one or more processor modules of the one or more processors 503) and/or computer-readable code or instructions stored in memory 505 and executable by at least one of the one or more processors 503 to perform the specially configured control data receiving and/or processing operations described herein. Further, for instance, the one or more processors 503 and/or memory 505 may execute actions or operations defined by a traffic data decoding component 512 for decoding traffic data based at least in part on control data received over the assigned control channel resources. In an aspect, for example, traffic data decoding component 512 may include hardware (e.g., one or more processor modules of the one or more processors 503) and/or computer-readable code or instructions stored in memory 505 and executable by at least one of the one or more processors 503 to perform the specially configured traffic data decoding operations described herein. Further, for instance, the one or more processors 503 and/or memory 505 may optionally execute actions or operations defined by a configuration receiving component 514 for obtaining a configuration indicating one or more parameters corresponding to decoding the traffic data based on the control data. In an aspect, for example, configuration receiving component 514 may include hardware (e.g., one or more processor modules of the one or more processors 503) and/or computer-readable code or instructions stored in memory 505 and executable by at least one of the one or more processors 503 to perform the specially configured configuration receiving operations described herein.

Similarly, in an aspect, eNB 504 may include one or more processors 553 and/or a memory 555 that may be communicatively coupled, e.g., via one or more buses 557, and may operate in conjunction with or otherwise implement a scheduling component 302 for scheduling one or more UEs to communicate over resources based on a ULL timeline (e.g., a timeline having a TTI that is less than a subframe in duration, such as the timelines 400, 402 in FIG. 4). For example, the various functions related to scheduling component 302 may be implemented or otherwise executed by one or more processors 553 and, in an aspect, can be executed by a single processor, while in other aspects, different ones of the functions may be executed by a combination of two or more different processors, as described above. It is to be appreciated, in one example, that the one or more processors 553 and/or memory 555 may be configured as described in examples above with respect to the one or more processors 503 and/or memory 505 of UE 502.

In an example, the one or more processors 553 and/or memory 555 may execute actions or operations defined by scheduling component 302 or its subcomponents. For instance, the one or more processors 553 and/or memory 555 may execute actions or operations defined by a control data generating component 520 for generating control data relating to one or more UEs over one or more sets of control channel resources. In an aspect, for example, control data generating component 520 may include hardware (e.g., one or more processor modules of the one or more processors 553) and/or computer-readable code or instructions stored in memory 555 and executable by at least one of the one or more processors 553 to perform the specially configured control data generating operations described herein. Further, for instance, the one or more processors 553 and/or memory 555 may execute actions or operations defined by a traffic data generating component 522 for generating traffic data for the one or more UEs. In an aspect, for example, traffic data generating component 522 may include hardware (e.g., one or more processor modules of the one or more processors 553) and/or computer-readable code or instructions stored in memory 555 and executable by at least one of the one or more processors 553 to perform the specially configured traffic data generating operations described herein. Further, for instance, the one or more processors 553 and/or memory 555 may execute actions or operations defined by an optional configuring component 524 for indicating one or more parameters related to decoding the traffic data based at least in part on the control data. In an aspect, for example, configuring component 524 may include hardware (e.g., one or more processor modules of the one or more processors 553) and/or computer-readable code or instructions stored in memory 555 and executable by at least one of the one or more processors 553 to perform the specially configured configuring operations described herein.

It is to be appreciated that transceivers 506, 556 may be configured to transmit and receive wireless signals through one or more antennas, an RF front end, one or more transmitters, and one or more receivers. In an aspect, transceivers 506, 556 may be tuned to operate at specified frequencies such that UE 502 and/or eNB 504 can communicate at a certain frequency. In an aspect, the one or more processors 503 may configure transceiver 506 and/or one or more processors 553 may configure transceiver 556 to operate at a specified frequency and power level based on a configuration, a communication protocol, etc. to communicate uplink signals 508 and/or downlink signals 509, respectively, over related uplink or downlink communication channels.

In an aspect, transceivers 506, 556 can operate in multiple bands (e.g., using a multiband-multimode modem, not shown) such to process digital data sent and received using transceivers 506, 556. In an aspect, transceivers 506, 556 can be multiband and be configured to support multiple frequency bands for a specific communications protocol. In an aspect, transceivers 506, 556 can be configured to support multiple operating networks and communications protocols. Thus, for example, transceivers 506, 556 may enable transmission and/or reception of signals based on a specified modem configuration.

In one example, in allocating resources for data transmissions (e.g., smaller data transmissions), control data generating component 520 can generate control data specifying traffic data resources for communicating the smaller data transmissions, which may include allocations of comparatively smaller size (e.g., less than 50 bits, around 10-50 bits, etc.) than usual (e.g., 25 resource blocks (RB) in ULL LTE, which allows for around 103 bits on uPDSCH). For example, the control data can include a resource grant sent over a uPDCCH, the first two bits of which may indicate location of the granted traffic data resources within shared data resources (e.g., a uPDSCH). In one example, control data generating component 520 can generate the resource grant for multiple UEs, which can indicate the same location of the granted traffic data resources such that multiple UEs can share the same traffic data resources for the smaller data transmissions. In this regard, in an example, control data generating component 520 may also include additional information in the resource grant for each UE, including a location within the granted traffic data resources that corresponds to the specific traffic data for a given UE. In any case, traffic data generating component 522 can generate the traffic data for one or more UEs according to the configuration indicated by the control data (e.g., sharing traffic data resources for multiple UEs or otherwise).

In this example, control data receiving component 510 can receive the control data over control channel resources assigned to the UE 502 (e.g., in a stage 0 or stage 1 grant in LTE/ULL LTE), which can include the resource grant (e.g., sent over uPDCCH). Traffic data decoding component 512 can accordingly determine resources over which to receive/decode traffic data based at least in part on the control data (e.g., the resource grant). For example, the control data can specify a location of the traffic data resources related to UE 502 (and/or other UEs) within shared data resources. Accordingly, communicating component 361 can receive shared data resources (e.g., a uPDSCH) from the eNB 504, and traffic data decoding component 512 can obtain the traffic data based on traffic data resources indicated in the resource grant (e.g., by obtaining traffic data from the location specified in the resource grant). Furthermore, where the traffic data relates to small data transmissions for multiple UEs, traffic data decoding component 512 can determine additional location information related to the traffic data within which specific traffic data for UE 502 resides, and can accordingly decode the traffic data from the specific location. Including the additional information may generate additional control data overhead based on the additional control data indicating more granular location information per resource grant. Accordingly, additional examples of allocating resources for communicating small data transmissions are described below in additional reference to FIGS. 6-9.

Figure 6:
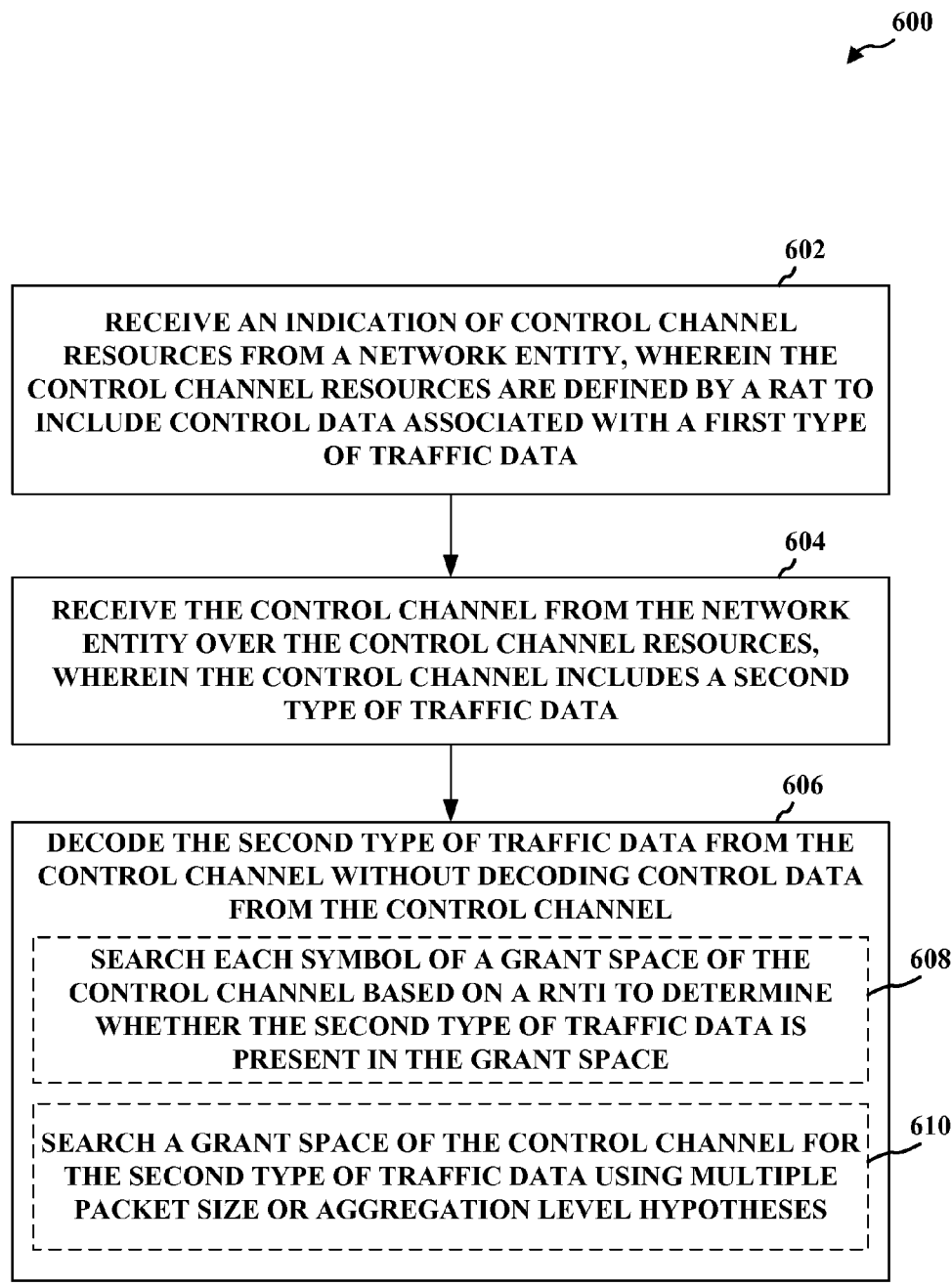
FIG. 6 illustrates a flow chart of an example method of receiving small data transmissions in control data resources in accordance with aspects described herein.

FIG. 6 illustrates an example method 600 for decoding (e.g., by a UE) traffic data in resources allocated for small data transmissions. At Block 602, a UE can receive (e.g., via transceiver 506) an indication of control channel resources from a network entity, wherein the control channel resources are defined by a RAT to include control data associated with a first type of traffic data. In an aspect, communicating component 361 can receive the indication of control channel resources from the network entity (e.g., from eNB 504), wherein the control channel resources are defined by a RAT (e.g., LTE, ULL LTE, etc.) to include control data associated with the first type of traffic data. For example, the control channel resources may include resources related to a uPDCCH, which generally includes resource grants associated with uPDSCH data resources. In an example, communicating component 361 may receive the indication of the control channel resources in one or more control channel assignments from the eNB 504. The indication of control channel resources may include an indication of a resource location (e.g., a set of time and/or frequency resources) of a grant space (e.g., a common and/or UE-specific search space) over which the eNB 504 transmit one or more control channels, and/or a radio network temporary identifier (RNTI) that can be used to decode control data from the one or more control channels.

In a specific example, communicating component 361 can receive the indication in a multiple stage resource grant (e.g., resource grant 580), such as a stage 0 and/or stage 1 grant from the eNB 504, as defined in for LTE and/or ULL LTE. For example, in a first stage resource grant (e.g., stage 0), it is to be appreciated that eNB 504 can include one or more parameters, which may include a modulation and coding scheme (MCS) for uplink grants, a transmit power control (TPC) for uplink communications from the UE, and/or precoding information. In, a second stage resource grant (e.g., stage 1), it is to be appreciated that eNB 504 can include one or more additional parameters that may be more dynamic than those in the first stage resource grant. These additional parameters may include a new data indicator (NDI) to indicate whether the UE is to retransmit a previous communication or a new communication, a HARQ process identity to indicate a HARQ process to which the NDI relates, a delta MCS to indicate a change in the MCS from the MCS signaled in the first stage resource grant, a reference signal (RS) cyclic shift indicating a cyclic shift to apply to resource blocks over granted resources when transmitting an RS, a ULL RS triggering indicator (e.g., one or more conditions or related parameters for triggering RS transmission at the UE), an aperiodic channel state information (CSI) trigger indicating one or more conditions or related parameters for reporting CSI, and/or an indication of the granted resources. In this example, eNB 504 can include the indication of the control channel resources in one or more stages of the multiple stage grant, which communicating component 361 can receive and accordingly determine control channel resources for obtaining control data (and/or traffic data, as described further herein).

At Block 604, the UE can receive the control channel from the network entity over the control channel resources, wherein the control channel includes a second type of traffic data. In an aspect, control data receiving component 510 can receive (e.g., via transceiver 506) the control channel from the network entity (e.g., from eNB 504) over the control channel resources, wherein the control channel includes the second type of traffic data. In this example, the control channel resources can carry the small data transmissions instead of control data relating to the resource grants related to uPDSCH (e.g., resource grant 580), at least in control channel resources for UE 502 and/or other UEs that are configured to receive the small data transmissions. In this regard, for example, the second type of traffic data (e.g., the small data transmissions for M2M or similar devices) includes a comparatively smaller data payload than the first type of traffic data (e.g., the first type of traffic data can be uPDSCH data for other UEs).

At Block 606, the UE can decode the second type of traffic data from the control channel without decoding control data from the control channel. In an aspect, traffic data decoding component 512 can decode the second type of traffic data from the control channel without decoding the control data from the control channel. For example, traffic data decoding component 512 can search the control channel resources (e.g., uPDCCH resources) for the second type of traffic data, which can correspond to a smaller data payload than the first type of traffic data.

In decoding the second type of traffic data from the control channel at Block 606 the UE may optionally, at Block 608, search each symbol of a grant space of the control channel based on a RNTI to determine whether the second type of traffic data is present in the grant space. The grant space can correspond to a common search space, UE-specific search space, etc. (e.g., as defined in LTE) over which eNB 504 can transmit control channels that can be encoded based on RNTIs for specific UEs (e.g., eNB 504 can implicitly encode the RNTI in a cyclic redundancy check (CRC) or other portion of signals transmitted in the common and/or UE-specific search space). Thus, for example, traffic data decoding component 512 can search each symbol (or other TTI duration) of the grant space of the control channel based on the RNTI to determine whether the second type of traffic data is present in the grant space. In one example, the RNTI can be a separate RNTI assigned by the eNB 504 for the UE 502 to determine when the control channel includes the second type of traffic data for the UE 502 (e.g., as opposed to the RNTI assigned by the eNB 504 for the UE 502 to obtain control data over the control channel). Thus, it is to be appreciated that traffic data decoding component 512 can attempt to decode signals in the grant space using the separate RNTI to determine second type traffic data that may be included for the UE 502.

Moreover, for example, in decoding the second type of traffic data from the control channel at Block 606, the UE may additionally or alternatively optionally, at Block 610, search a grant space of the control channel for the second type of traffic data using multiple packet size or aggregation level hypotheses. In an aspect, traffic data decoding component 512 can search the grant space of the control channel for the second type of traffic data using multiple packet size or aggregation level hypotheses (e.g., without typical coding/aggregation constraints). This can include traffic data decoding component 512 searching the common and/or UE-specific search space for packets of various sizes/aggregation levels including, for example, 45, 90, 135, 180, etc. resource elements (RE) to detect and obtain the traffic data. In addition, the UE 502 can tolerate a larger number of blind decodes over the grant space as the timeline for receiving the second type of control data is more lax (e.g., as compared to where the control data indicates resources for the first type of traffic data, which are then monitored for receiving the first type of traffic data).

Using the control channel to transmit the second type of traffic data having the smaller allocation size, in this regard, also potentially allows for traffic data resources (and associated resource grants communicated over the control channel) to be reserved for other UEs that communicate using larger data allocations typically defined in the RAT (e.g., 25 RBs in ULL LTE, etc.). Moreover, as the control channel resources are used for data transmissions of the second type of traffic data in the above example, retransmissions (e.g., based on a HARQ mechanism) for these data transmissions in a subsequent control channel may be synchronous and occur a fixed period of time (e.g., a fixed number of symbols, subframes, etc.) after transmission of the control channel that includes the second type of traffic data. The fixed period of time may be known by the UE 502 and eNB 504 (e.g., based on stored configurations, configurations communicated from eNB 504 to UE 502, etc.), such that UE 502 can expect retransmissions from eNB 504 in the fixed period of time after the initial transmission (or a prior retransmission).

Figure 7:
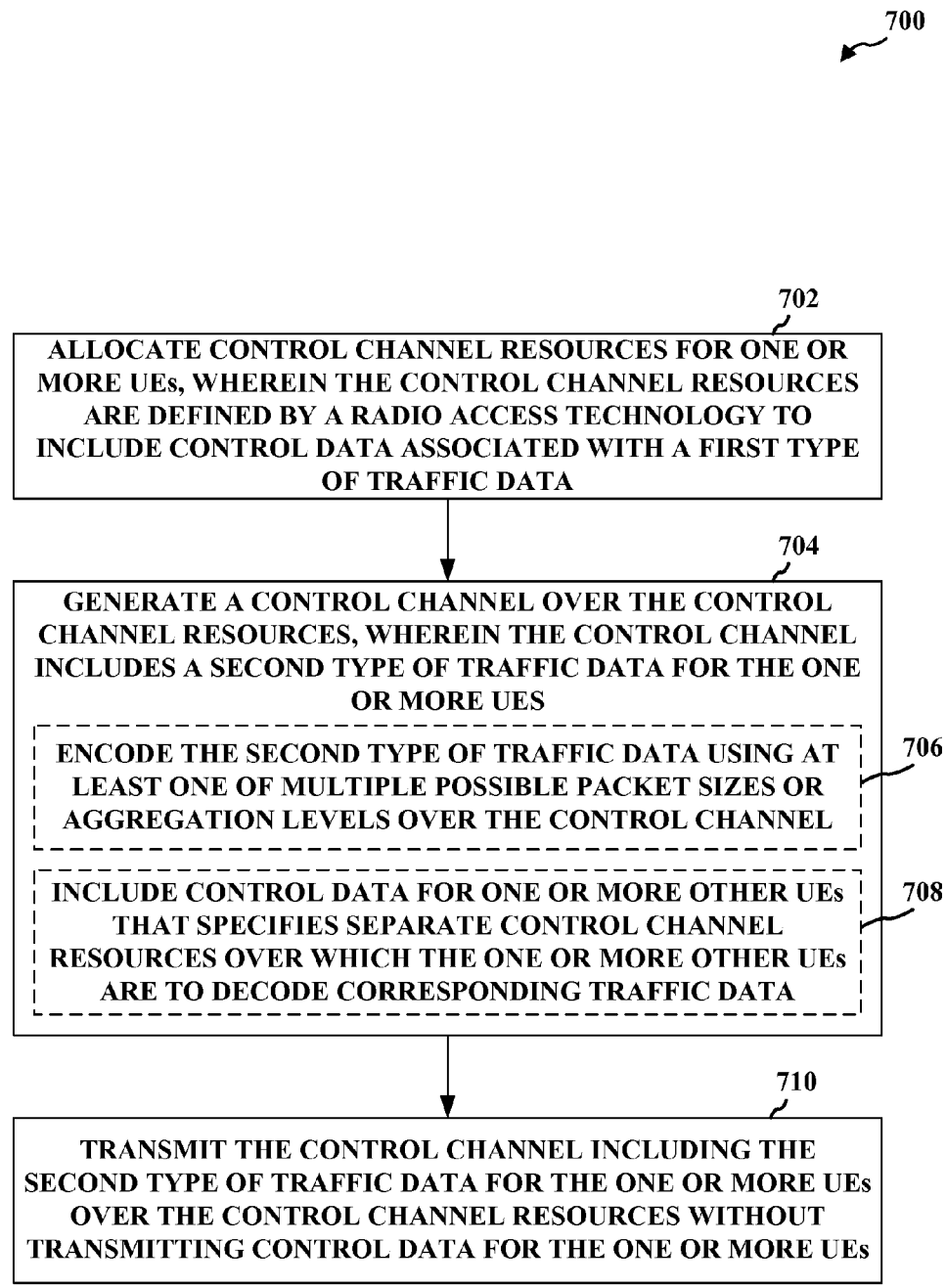
FIG. 7 illustrates a flow chart of an example method of transmitting small data transmissions in control data resources in accordance with aspects described herein.

FIG. 7 illustrates an example method 700 for transmitting (e.g., by an eNB) traffic data on control channel resources for small data transmissions. At Block 702, the eNB can allocate control channel resources for one or more UEs, wherein the control channel resources are defined by a RAT to include control data associated with a first type of traffic data. In an aspect, scheduling component 302 can allocate the control channel resources for the one or more UEs (e.g., for UE 502), wherein the control channel resources are defined by the RAT (e.g., LTE, ULL LTE, etc.) to include control data associated with the first type of traffic data. As described, for example, the control channel resources can correspond to uPDCCH resources that are defined to include resource grants for uPDSCH communications. In addition, in an example, scheduling component 302 can allocate the control channel resources to the UE 502 in a multiple stage grant (e.g., resource grant 580) defined for the RAT. In an example, scheduling component 302 can allocate the control channel resources at least in part by indicating a location of resources (e.g., a portion of time and/or frequency) related to a grant space transmitted by the eNB 504, a RNTI for the UE 502 to decode control data (or traffic data) over the grant space, etc.

At Block 704, the eNB can generate a control channel over the control channel resources, wherein the control channel includes a second type of traffic data for the one or more UEs. In an aspect, control data generating component 520 can generate the control channel over the control channel resources, wherein the control channel include the second type of traffic data for the one or more UEs (e.g., UE 502). As described, for example, the second type of traffic data (e.g., the small data transmissions for M2M or similar devices) includes a comparatively smaller data payload than the first type of data (e.g., uPDSCH data for other UEs), and thus can use a smaller resource allocation size. Control data generating component 520 can generate the control data for transmission over uPDCCH resources, in one example.

In generating the control channel at Block 704, the eNB may optionally, at Block 706, encode the second type of traffic data using at least one of multiple possible packet sizes or aggregation levels over the control channel. Control data generating component 520 can generate the control data including the second type of traffic data and can encode at least the second type of traffic data using at least one of the multiple possible packet sizes or aggregation levels (e.g., depending on an amount of traffic data to communicate over the control channel).

In generating the control channel at Block 704, the eNB may additionally or alternatively optionally, at Block 708, include control data for one or more other UEs that specifies separate control channel resources over which the one or more other UEs are to decode corresponding traffic data. Control data generating component 520 may include the control data for the one or more UEs where the control data specifies separate control channel resources over which the one or more other UEs are to decode corresponding traffic data (e.g., the first type of traffic data).

At Block 710, the eNB can transmit (e.g., via transceiver 556) the control channel including the second type of traffic data for the one or more UEs over the control channel resources without transmitting control data for the one or more UEs. In an aspect, scheduling component 302 can transmit the control channel including the second type of traffic data for the one or more UEs over the control channel resources without transmitting control data for the one or more UEs. Thus, for example, traffic data generating component 522 can generate the traffic data in the control channel resources assigned to UE 502. As described, the control channel resources can be assigned or otherwise defined for the UE 502 in the multiple stage grant (e.g., based on an identified resource location, separate RNTI for decoding the control channel resources, etc.). As described, traffic data generating component 522 can generate traffic data of various sizes/aggregation levels, etc., and can map the traffic data to granted resources over the uPDCCH for the given UE 502 (e.g., based on the corresponding RNTI). Thus, uPDSCH resources need not be used for the small data transmissions to UE 502 and/or similar UEs. Moreover, as described, scheduling component 302 can retransmit the traffic data if requested (e.g., based on a HARQ mechanism) in a fixed period of time (e.g., a fixed number of symbols, subframes, etc.) after transmission of the control data that includes the traffic data, where the fixed period of time is known by the UE 502 and eNB 504 (e.g., based on stored configuration, configuration provided by the eNB 504 to the UE 502, etc.).

Figure 8:
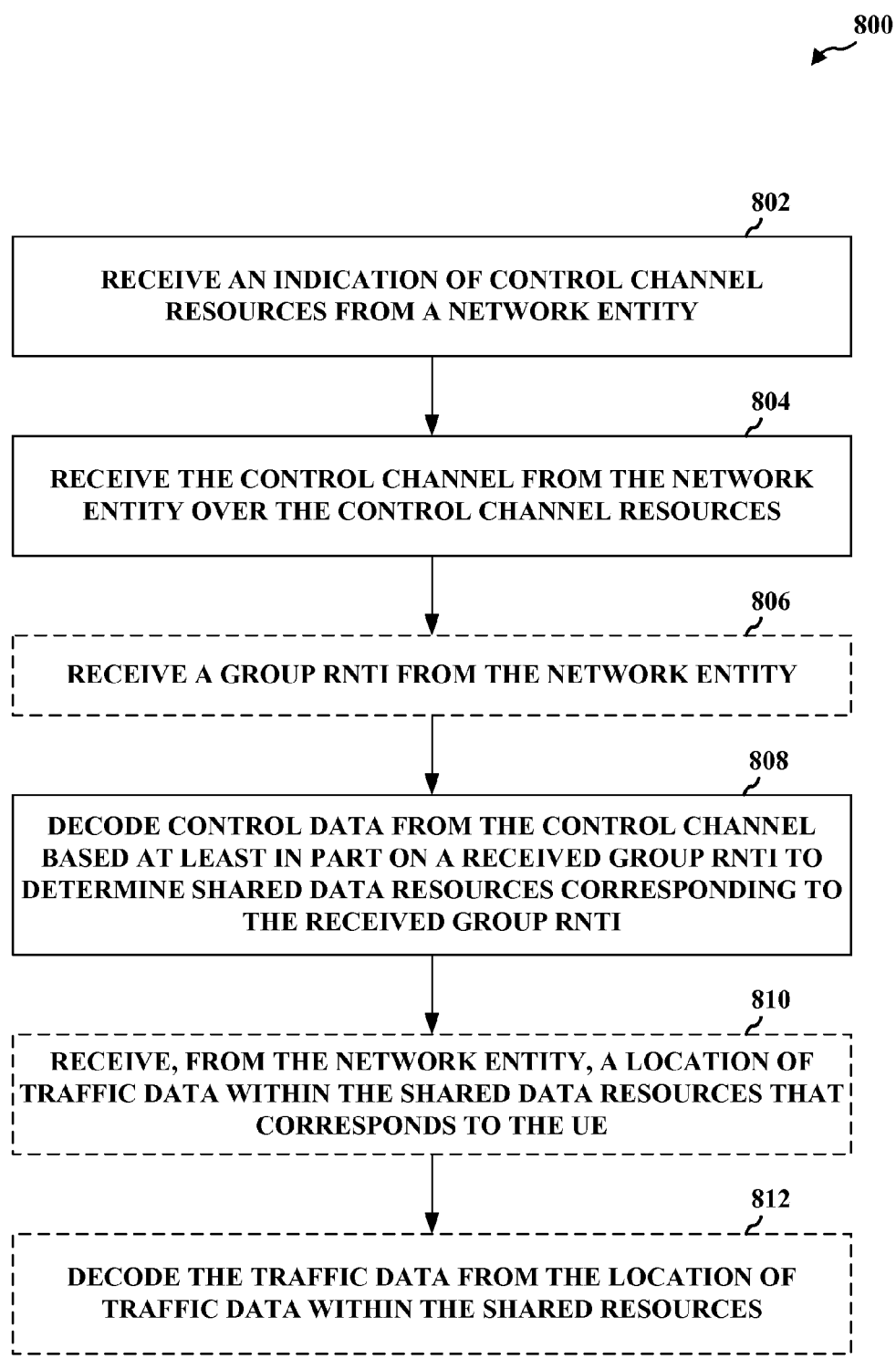
FIG. 8 illustrates a flow chart of an example method of receiving small data transmissions in a group of transmissions for multiple user equipment (UE) in accordance with aspects described herein.

FIG. 8 illustrates an example method 800 for determining (e.g., by a UE) data resources for data transmissions (e.g., smaller data transmissions, as described herein). At Block 802, the UE can receive an indication of control channel resources from a network entity. As described, in an aspect, communicating component 361 can receive (e.g., via transceiver 506) the indication of control channel resources from the network entity (e.g., eNB 504). In an example, communicating component 361 may receive the indication of the control channel resources as a control channel assignment from the eNB 504 (e.g., in a multiple stage grant), as described. In this example, the indication may relate to a set of control channel resources (e.g., a uPDCCH) related to control data, where the control data may indicate resources (e.g., a uPDSCH) over which traffic data is communicated.

At Block 804, the UE can receive (e.g., via transceiver 506) the control channel from the network entity over the control channel resources. In an aspect, control data receiving component 510 can receive the control channel from the network entity (e.g., from eNB 504) over the control channel resources. As described, the control channel can include control data specifying resource grant information (e.g., resource grant 580) for a shared data channel (e.g., a uPDSCH). For example, the resource grant information for the shared data channel can correspond to resources including traffic data for a group of UEs.

At Block 806, the UE can optionally receive a group RNTI from the network entity. In an aspect, configuration receiving component 514 can receive (e.g., via transceiver 506) the group RNTI from the network entity (e.g., from eNB 504). The group RNTI can correspond to control channel resources transmitted by the eNB 504 in the grant space (e.g., common and/or UE-specific search space). In an example, configuring component 524 can configure the group RNTI for the UE 502 (e.g., when the UE 502 powers on and requests access to the wireless network via eNB 504 or otherwise communicates with eNB 504), and configuration receiving component 514 can receive the group RNTI.

Accordingly, at Block 808, the UE can decode control data from the control channel based at least in part on a received group RNTI to determine shared data resources corresponding to the received group RNTI. In an aspect, traffic data decoding component 512 can decode the control data from the control channel based at least in part on the received group RNTI to determine the shared data resources corresponding to the received group RNTI. For example, traffic data decoding component 512 can decode the control data at least in part by searching the grant space for control channel resources based on the group RNTI. The control data can indicate granted shared data channel resources (e.g., a uPDSCH) for the group of UEs where the data traffic over the shared data channel resources can include smaller data allocations for each of the UEs in the group of UEs.

Thus, at Block 810, the UE can optionally also receive, from the network entity, a location of traffic data within the shared data resources that corresponds to the UE. In an aspect, configuration receiving component 514 can receive, from the network entity (e.g., from eNB 504 via transceiver 506) the location of traffic data within the shared data resources that corresponds to UE 502. Thus, for example, the shared data resources can accordingly correspond to traffic data for a group of multiple UEs that is apportioned over the shared data resources, as described, and traffic data decoding component 512 can further decode the traffic data for UE 502 at least in part by decoding traffic data at a location/region within the shared data resources that corresponds to UE 502. This location/region can similarly be configured by configuring component 524 and received by configuration receiving component 514 (e.g., in upper layer signaling, such as radio resource control (RRC) signaling).

At Block 812, the UE can optionally decode the traffic data from the location of traffic data within the shared resources. In an aspect, traffic data decoding component 512 can decode the traffic data from the location of traffic data within the share resources. Accordingly, the location/region can be scalable and/or dynamic for a given UE, unambiguous, and not affected by variable sizing of the shared data channel resources. Moreover, the eNB 504 can use the same aggregation level for the traffic data included in the shared data channel resources for the group of UEs.

Figure 9:
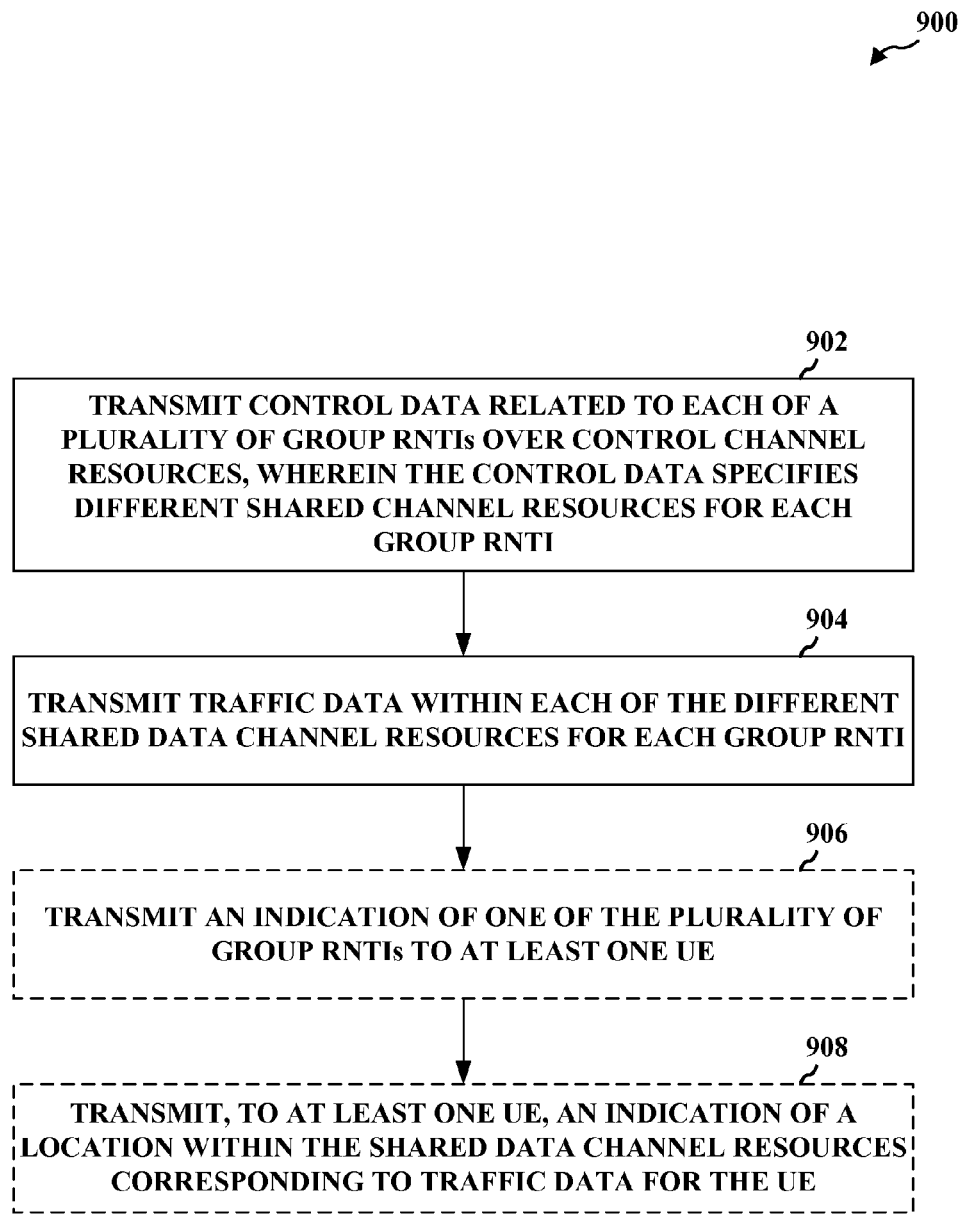
FIG. 9 illustrates a flow chart of an example method of transmitting small data transmissions in a group of transmissions for multiple UEs in accordance with aspects described herein.

FIG. 9 illustrates a method 900 for transmitting (e.g., by a eNB) control data related to a plurality of group RNTIs. At Block 902, the eNB may transmit control data related to each of a plurality of group RNTIs over control channel resources, wherein the control data specifies different shared channel resources for each group RNTI. In an aspect, scheduling component 302 can transmit (e.g., via transceiver 556) the control data related to each of the plurality of group RNTIs over the control channel resources. As described, scheduling component 302 can allocate the control channel resources to UEs that correspond to the group RNTIs (e.g., in a multiple stage grant). Control data generating component 520 can accordingly generate the control data to indicate shared data channel resources over which traffic data for a group of UEs related to a given group RNTI is transmitted (e.g., smaller data transmissions).

At Block 904, the eNB can transmit traffic data within each of the different shared data channel resources for each group RNTI. In an aspect, scheduling component 302 can transmit (e.g., via transceiver 556) the traffic data within each of the different shared data channel resources for each group RNTI. For example, traffic data generating component 522 can generate traffic data for given UEs associated with a group RNTI over the same set of shared data channel resources (e.g., uPDSCH resources), which are indicated in the resource grant (e.g., resource grant 580) specified by the control data over control channel resources (e.g., uPDCCH resources).

At Block 906, the eNB can optionally transmit (e.g., via transceiver 556) an indication of one of the plurality of group RNTIs to at least one UE. Configuring component 524 can also configure group RNTIs to one or more UEs (e.g., UE 502), and scheduling component 302 can transmit the indication of one of the plurality of group RNTIs to at least one UE. This can facilitate locating the traffic data for the UE in the group within shared data channel resources (e.g., uPDSCH) from eNB 504, as described.

At Block 908, the eNB can optionally transmit, to at least one UE, an indication of a location within the shared data channel resources corresponding to the traffic data for the UE. In an aspect, configuring component 524 can indicate (e.g., by transmitting via transceiver 556), to each UE 502 associated with the group RNTI, an indication of the location within the shared data channel resources corresponding to traffic data specific to the UE 502 to allow the UE to decode its traffic data in the shared data channel resources, as described. This can be indicated in upper layer signaling (e.g., RRC signaling), for example.

It is understood that the specific order or hierarchy of steps in the processes disclosed is an illustration of exemplary approaches. Based upon design preferences, it is understood that the specific order or hierarchy of steps in the processes may be rearranged. Further, some steps may be combined or omitted. The accompanying method claims present elements of the various steps in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described herein that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed as a means plus function unless the element is expressly recited using the phrase "means for."

What is claimed is:

1. A method of wireless communication, comprising:
receiving a first indication of control channel resources from a network entity, wherein the control channel resources are defined by a radio access technology to include control data associated with a first type of traffic data;
receiving a control channel from the network entity over the control channel resources, wherein the control channel includes a second type of traffic data, wherein the second type of traffic data includes a comparatively smaller data payload than the first type of traffic data;
receiving a group radio network temporary identifier (RNTI) to use in decoding the second type of traffic data from the control channel; and
decoding, based at least in part on the group RNTI, the second type of traffic data from the control channel without decoding control data from the control channel, wherein the decoding of the second type of traffic data comprises:
searching a grant space of the control channel for grouped traffic data using the group RNTI, wherein the grouped traffic data includes data for multiple user equipment (UEs);
determining, from the grouped traffic data, a resource location of the second type of traffic data within the grouped traffic data assigned to a given UE of the multiple UEs; and
decoding, at the resource location, the second type of traffic data for the given UE.

2. The method of claim 1, further comprising receiving, from the network entity, a retransmission of the second type of traffic data in a subsequent control channel over subsequent control channel resources configured at a fixed period of time from the control channel resources.

3. The method of claim 1, wherein receiving the first indication comprises receiving the first indication of the control channel resources in one or more stages of a multiple stage grant from the network entity.

4. The method of claim 1, wherein the control channel resources correspond to an ultra low latency (ULL) physical downlink control channel (uPDCCH) that is based on a transmission time interval that is less than a subframe in duration.

5. The method of claim 1, wherein receiving the group RNTI comprises receiving, from the network entity, the group RNTI.

6. The method of claim 1, further comprising receiving, from the network entity, an indication of the resource location for the given UE.

7. The method of claim 6, wherein receiving the indication of the resource location for the given UE comprises receiving, from the network entity, the indication of the resource location for the given UE in radio resource control (RRC) layer signaling.

8. A user equipment for wireless communication, comprising:
a transceiver;
at least one processor communicatively coupled with the transceiver, via a bus, for communicating signals in a wireless network; and
a memory communicatively coupled with the at least one processor and/or the transceiver via the bus;
wherein the at least one processor and the memory are operable to:
receive, via the transceiver, a first indication of control channel resources from a network entity, wherein the control channel resources are defined by a radio access technology to include control data associated with a first type of traffic data;
receive, via the transceiver, a control channel from the network entity over the control channel resources, wherein the control channel includes a second type of traffic data, wherein the second type of traffic data includes a comparatively smaller data payload than the first type of traffic data;
receive a group radio network temporary identifier (RNTI) to use in decoding the second type of traffic data from the control channel; and
decode, based at least in part on the group RNTI, the second type of traffic data from the control channel without decoding control data from the control channel,
wherein the at least one processor and memory are operable to decode the second type of traffic data at least in part by:
searching a grant space of the control channel for grouped traffic data using the group RNTI, wherein the grouped traffic data includes data for multiple user equipment (UEs);

determining, from the grouped traffic data, a resource location of the second type of traffic data within the grouped traffic data assigned to the user equipment; and decoding, at the resource location, the second type of traffic data for the user equipment.

9. The user equipment of claim 8, wherein the at least one processor and the memory are further operable to receive, from the network entity via the transceiver, a retransmission of the second type of traffic data in a subsequent control channel over subsequent control channel resources configured at a fixed period of time from the control channel resources.

10. The user equipment of claim 8, wherein the at least one processor and the memory are operable to receive the first indication of the control channel resources in one or more stages of a multiple stage grant from the network entity.

11. The user equipment of claim 8, wherein the control channel resources correspond to an ultra low latency (ULL) physical downlink control channel (uPDCCH) that is based on a transmission time interval that is less than a subframe in duration.

12. The user equipment of claim 8, wherein the at least one processor and the memory are operable to receive the group RNTI from the network entity.

13. The user equipment of claim 8, wherein the at least one processor and the memory are further operable to receive, from the network entity, an indication of the resource location for the user equipment.

14. The user equipment of claim 13, wherein the at least one processor and the memory are operable to receive the indication of the resource location for the given UE from the network entity in radio resource control (RRC) layer signaling.

15. A user equipment for wireless communication, comprising:
means for receiving a first indication of control channel resources from a network entity, wherein the control channel resources are defined by a radio access technology to include control data associated with a first type of traffic data;
means for receiving a control channel from the network entity over the control channel resources, wherein the control channel includes a second type of traffic data, wherein the second type of traffic data includes a comparatively smaller data payload than the first type of traffic data;
means for receiving, from the network entity, a group radio network temporary identifier (RNTI) to use in decoding the second type of traffic data from the control channel; and
means for decoding, based at least in part on the group RNTI, the second type of traffic data from the control channel without decoding control data from the control channel,
wherein the means for decoding decodes the second type of traffic data at least in part by:
searching a grant space of the control channel for grouped traffic data using the group RNTI, wherein the grouped traffic data includes data for multiple user equipment (UEs);
determining, from the grouped traffic data, a resource location of the second type of traffic data within the grouped traffic data assigned to the user equipment and decoding, at the resource location, the second type of traffic data for the user equipment.

16. The user equipment of claim 12, further comprising means for receiving, from the network entity, a retransmission of the second type of traffic data in a subsequent control channel over subsequent control channel resources configured at a fixed period of time from the control channel resources.

17. The user equipment of claim 12, wherein means for receiving receives the first indication of the control channel resources in one or more stages of a multiple stage grant from the network entity.

18. The user equipment of claim 15, wherein the means for receiving the group RNTI receives the group RNTI from the network entity.

19. The user equipment of claim 15, further comprising means for receiving, from the network entity, an indication of the resource location for the user equipment.

20. The user equipment of claim 19, wherein the means for receiving the indication of the resource location for the given UE receives the indication of the resource location for the given UE from the network entity in radio resource control (RRC) layer signaling.

21. A non-transitory computer-readable storage medium comprising computer-executable code for wireless communications, the code comprising:
code for receiving a first indication of control channel resources from a network entity, wherein the control channel resources are defined by a radio access technology to include control data associated with a first type of traffic data;
code for receiving a control channel from the network entity over the control channel resources, wherein the control channel includes a second type of traffic data, wherein the second type of traffic data includes a comparatively smaller data payload than the first type of traffic data;
code for receiving, from the network entity, a group radio network temporary identifier (RNTI) to use in decoding the second type of traffic data from the control channel; and
code for decoding, based at least in part on the group RNTI, the second type of traffic data from the control channel without decoding control data from the control channel,
wherein the code for decoding decodes the second type of traffic data at least in part by:
searching a grant space of the control channel for grouped traffic data using the group RNTI, wherein the grouped traffic data includes data for multiple user equipment (UEs);
determining, from the grouped traffic data, a resource location of the second type of traffic data within the grouped traffic data assigned to a given UE of the multiple UEs; and
decoding, at the resource location, the second type of traffic data for the given UE.

22. The non-transitory computer-readable storage medium of claim 21, further comprising code for receiving, from the network entity, a retransmission of the second type of traffic data in a subsequent control channel over subsequent control channel resources configured at a fixed period of time from the control channel resources.

23. The non-transitory computer-readable storage medium of claim 21, wherein code for receiving receives the first indication of the control channel resources in one or more stages of a multiple stage grant from the network entity.

24. The non-transitory computer-readable storage medium of claim 21, wherein the code for receiving the group RNTI receives, from the network entity, the group RNTI.

25. The non-transitory computer-readable storage medium of claim 21, the code further comprising code for receiving, from the network entity, an indication of the resource location for the given UE.

26. The non-transitory computer-readable storage medium of claim 25, wherein the code for receiving the indication of the resource location for the given UE receives, from the network entity, the indication of the resource location for the given UE in radio resource control (RRC) layer signaling.

\* \* \* \* \*